United States Patent Office 3,035,546
Patented May 22, 1962

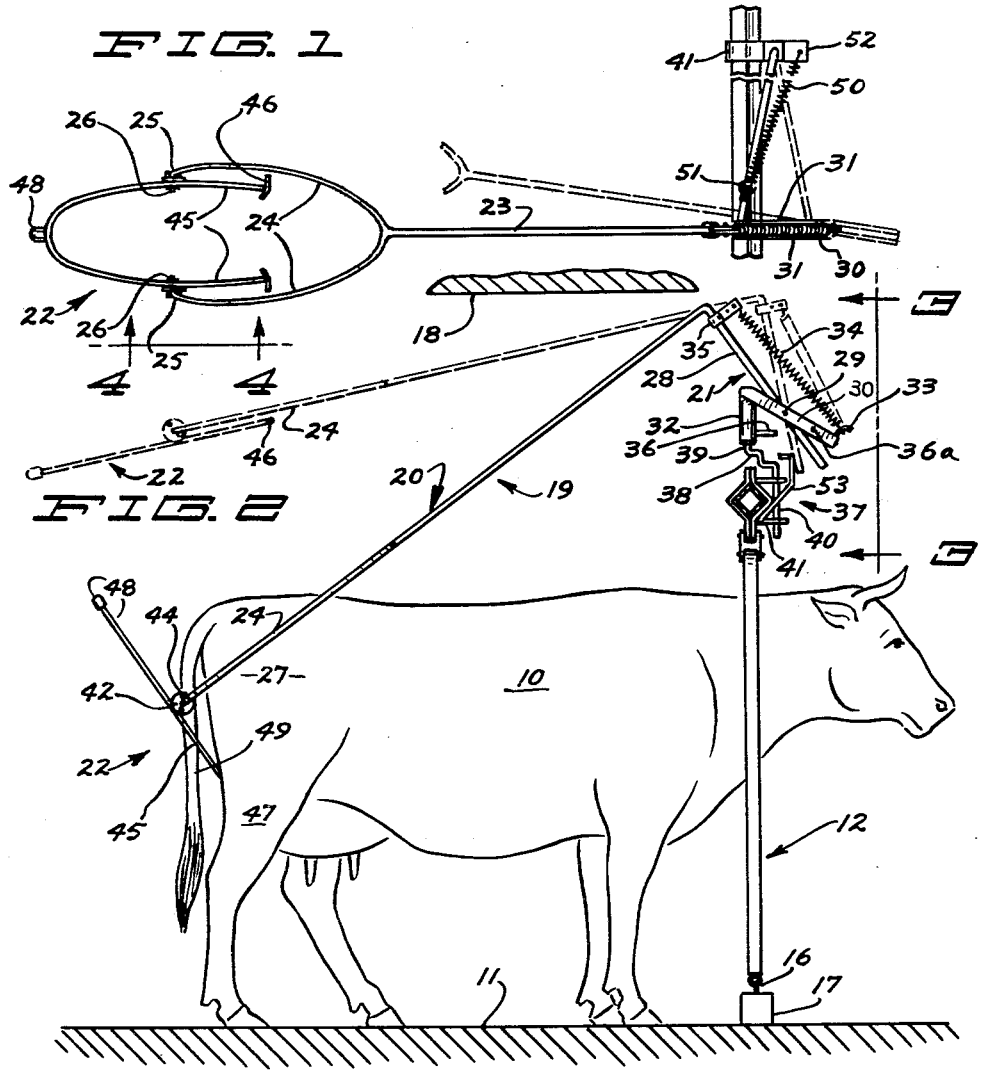

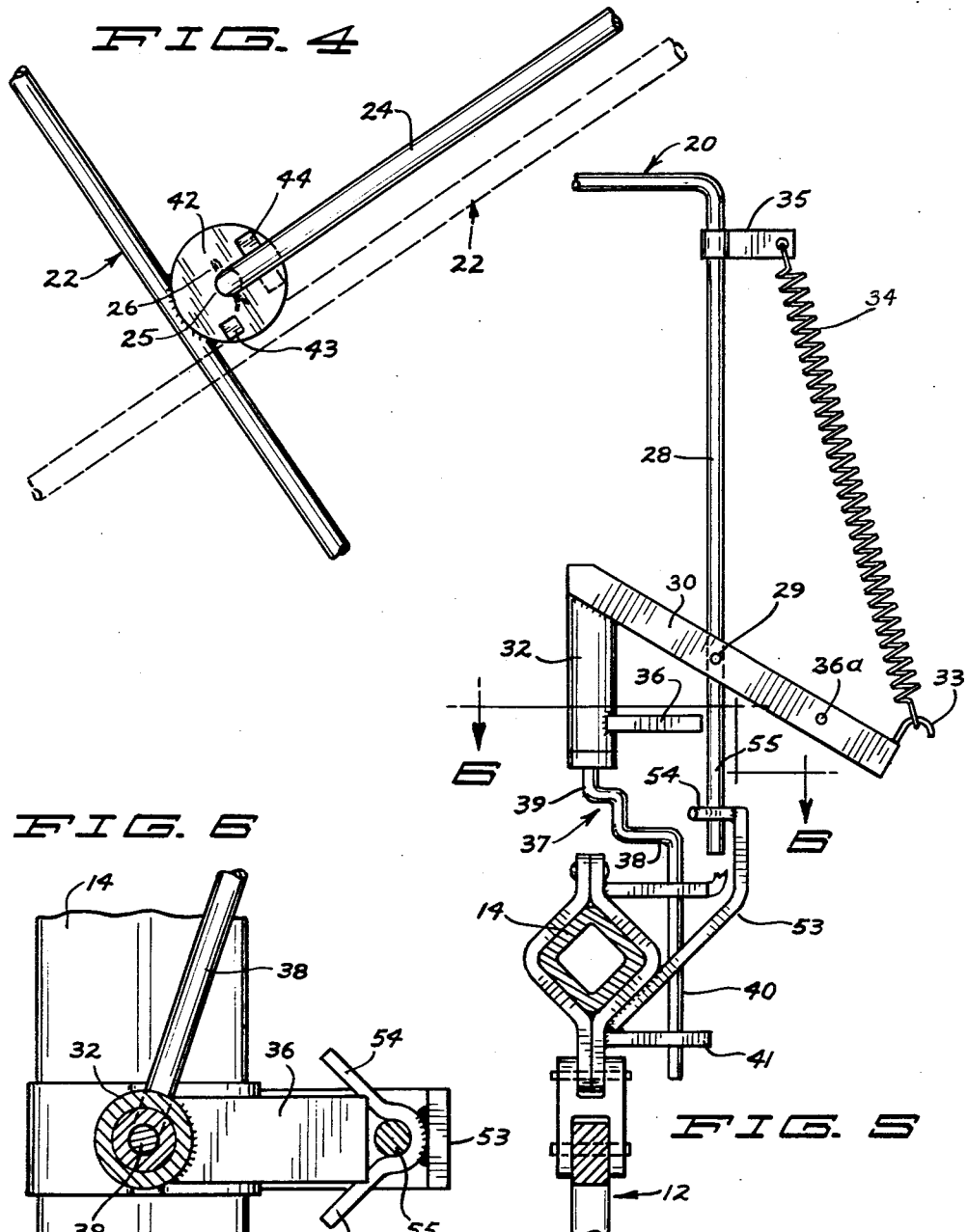

3,035,546
COW TAIL GUARD
John A. Peters, Box 72, Dalmeny, Saskatchewan, Canada
Filed Feb. 17, 1959, Ser. No. 793,776
5 Claims. (Cl. 119—105)

This invention relates to dairy barn equipment, and more particularly to apparatus for restraining a cow's tail from switching while the cow is positioned in a stanchion for milking.

It is an important object of the invention to provide a tail guard which will offer but a small amount of inconvenience in its operation but will effectively prevent switching of a cow's tail so as to minimize unsanitary conditions and discomfort to persons near the cow who may otherwise be struck by the tail when it is switched.

More specifically, it is an object of the invention to provide a lightweight tail guard which is simple in construction and can be quickly applied or removed from its position relative to the rear quarters of the cow.

Another object is to provide a cow tail restraining device which will be effective for the purpose described irrespective of the sideways or endwise shifting movement of the cow to which the device is applied as she is secured in her stanchion.

A further object of the invention is to provide a cow tail guard which is so mounted with respect to a cow and her stanchion that the guard, during non-use, will be held completely out of the way adjacent the ceiling of the barn structure over the stanchion and, when lowered into position, will be effective to restrain switching of the cow's tail without interfering with milking chores and attendance to the animal.

These and other objects and advantages of my invention will more fully appear from the following description, made in connection with the accompanying drawings, wherein like reference characters refer to the same parts throughout the several views and in which:

FIGURE 1 is a top plan view of the tail guard in mounted position, the dotted outline indicating an arbitrary position to which the device can be swung;

FIGURE 2 is a side elevation of the device operably positioned over a cow, the dotted line configuration showing an intermediate position of the device as it is raised from the cow;

FIGURE 3 is a front view of the apparatus showing a fragment of the stanchion assembly to which it is mounted, the dotted lines showing an alternate position to which the device can be swung;

FIGURE 4 is an enlarged fragment looking in the direction of the arrows in FIGURE 1;

FIGURE 5 is an enlarged detail of the holding and positioning means during non-use; and FIGURE 6 is a horizontal section taken on the line 6—6 of FIGURE 5.

With continued reference to the drawing, my invention contemplates means for positioning a cow 10 at a stall area 11 by such means as a conventional stanchion assembly 12, the latter comprising, in turn, a latchable stanchion bar 13 mounted on a horizontal bar 14 by means of clamp 15 to permit the stanchion 13 to depend vertically and be swingably secured at 16 to a base block 17. Overlying the stall area 11 is usually the conventional barn ceiling 18 and other structure such as drinking fountains and feed boxes (not shown).

My cow tail guard is indicated generally at 19 and has an elongated body 20, mount 21, and a tail-encircling portion 22, each of which will be described in detail.

The body 20 may consist of a rod or tube which is straight and elongated at its medial portion 23 and is bifurcated rearwardly in forked legs 24 which, in turn, may be bent inwardly to form pivots 25 which in turn are provided with fasteners such as cotter keys 26 as shown in FIG. 4. The legs 24 may be conveniently bowed to rest comfortably and conveniently upon the buttocks 27 of cow 10. The legs 24 may be constructed of bendable material or may be furnished in several shapes to conform to the size and configuration of cow 10.

The forward end of the elongated body 20 terminates in a sharply bent portion 28 which is pivotally mounted at 29 to bracket 30, as shown in FIG. 2. The bracket 30 consists of spaced parallel sides 31 which are secured as by welding to a vertical sleeve 32, as shown in FIGS. 2 and 5. The lower end of bracket 30 is provided with a hook 33 to which tension spring 34 is attached, as shown. The upper end of spring 34 is secured to a clamp 35, in turn secured to the bent portion 28 adjacent the forward end of the straight intermediate body or frame 23. It will be noted that the bent portion 28 extends beyond its pivot connection 29 so that it may abut against a stop 36 secured to the lower end of sleeve 32 so as to limit the degree to which the elongated frame or body 20 will rock upwardly, as shown in FIG. 5. Thus, if ceiling 18 were absent or unusually high, the guard would still remain within reach when pulled up to stand-by posiiton by spring 34. A second stop in the form of cross pin 36a on bracket 30 limits the downward rocking movement of the guard.

The mount 21 is positioned upon mounting means 37 which, in turn, comprises a crank member 38 having an upwardly extending portion 39 rotatably received within the sleeve 32 and a downwardly extending portion 40 rotatably received within bracket 41 which is secured to the stanchion assembly 12, as shown in FIGS. 2 and 3.

The forked legs 24 which extend rearwardly from the intermediate body or frame portion 23 are adapted to extend rearwardly of the buttocks 27 of cow 10 and pivotally carry at their ends 25 a tail-restraining looped member 22 by means of the bearing plates 42 secured thereto in horizontally aligned relation, as shown in FIGS. 1 and 4. Each of the bearing plates 42 has abutments 43 and 44 which limit the swing of member 22 to approximately 90°. The tail-restraining looped member 22 is provided with inwardly extending arms 45, each of which have rests 46 laterally terminating at their ends, which are adapted to lightly contact the back of the cow's legs 47, as shown in FIG. 2. A weight member 48 may be secured to the closed end 44 of the trail-restraining member 22 so that the contact between the ends 46 and legs 47 will be effected through gravity alone. The tail 49 will thus normally lie in encircled relation by looped member 22 and the legs 24 of the guard.

In order to constantly urge the guard forwardly to effect contact between the member 22 and the legs of the cow when she may shift her position to and from the stanchion assembly 12, I provide a tension spring 50 which is secured at one end to a bracket 51 mounted on the crank 38 adjacent the upwardly extending portion 39 and at its other end to an upstanding extension 52 of the bracket 41, as shown in FIGS. 1 and 3. The bracket 51 and extension 52 are so positioned that the spring 50 will maintain clearance above crank 38 and will permit the entire guard to be swung rearwardly away from cow 10 over dead-center and to the dotted line position of FIG. 3. The guard may then function in the same manner over another cow positioned in an adjacent stanchion (not shown). The guard will, of course, still be urged forwardly since the relative position of spring 50 will remain the same.

Since the spring 50 urges the entire guard forwardly, it is desirable to provide abutment means which will limit the forward movement and maintain the guard within easy reach of an operator. To this end, I provide a positioning and abutment element 53 which may be secured to clamp 15 at the upper end of stanchion assemblage 12. The positioning and abutment element 53 has a V-shaped upper portion 54 which is adapted to catch and position the lowermost end 55 of the bent portion 28 when the guard is in its uppermost position, as shown in FIG. 5.

In the use and operation of my cow tail guard, the device may be raised with the lower free end 55 of bent portion 28 cradled in the V-shaped member 54 and held centered against sideways movement. Spring 34 has considerably more leverage when the guard 19 is raised since the hook 33 and clamp 35 cause the spring 34 to move away from pivot point 29 and effectively increase the moment force exerted upon the bent mounting portion 28 and, hence, upon the entire cow tail guard. Spring 34 may be tensioned adequately to overcome the weight of the guard rearwardly from the mount. When in the raised position, the abutments 43 will stop the counter-clockwise swing of member 22 as they contact the legs 24, thus holding the looped member 22 in the dotted line position as shown in FIG. 2.

Now, when cow 10 is in position in the stall area and held by stanchion assembly 12, the cow tail guard 19 may be pulled rearwardly so that the end 55 of bent portion 28 is moved rearwardly of its cradled position in V-shaped member 54. The device is then pulled downwardly so that end 55 clears V-shaped member 54 and is lowered until the legs 24 rest lightly upon the buttocks 27 of the cow. The looped member 22 will, of course, be rotated somewhat in a clockwise direction to bring the weighted end 48 upwardly, as shown in FIG. 2. The guard 19 will thus be in the full line position and the tension spring 34 will be extended somewhat, as shown. However, since the effective radial distance has been reduced with respect to the axis of pivot 29, the spring 34 will no longer be able to lift the weight of the guard. There will be a counter-balancing effect, however, which will permit the legs 24 to rest in light contact with the buttocks 27 and without exerting any annoying force thereupon. Similarly, the tail-restraining looped member 22 will tend to pivot in a counterclockwise direction, bringing the lateral rests 46 at the ends of the arms 45 in contact with the cow's legs. This contact is light and, hence, will not annoy or aggravate the cow. It will be noted that the space defined by the tail-restraining looped member 22 and the forked legs 24 is free and unrestricted, as shown in FIG. 1, and yet the tail 49 is encircled to prevent switching thereof. If the cow attempts to switch tail 49, it will strike either the legs 24, or the arms 45. If cow 10 moves forwardly or rearwardly with respect to the stanchion assembly 12, the spring 50 will merely yield and permit the crank 38 to move forwardly and rearwardly but will not permit twisting of the elongated body or frame portion 20. On the other hand, if cow 10 were to move sideways, then the forward sleeve 32 will merely pivot about the upper extension 39 of crank 38. Any upward or downward movement of the cow will merely permit the guard to pivot about the axis 29 and within the limits of stops 36 and 36a will still maintain the tail-encircling looped member 22 and legs 24 in their light contact with the legs and buttocks of cow 10. The horizontal relationship of the axis extending through pivots 25 is maintained at all times. The guard will not interfere with either a hand or machine milking procedure and requires no tying or untying when placing the guard into operation or raising it upwardly for non-use.

It will, of course, be understood that various changes may be made in the form, details, arrangements and proportions of the parts without departing from the scope of my invention as set forth in the appended claims.

What I claim is:

1. In a stanchion assembly having a cow tail guard the improvement comprising an elongated body terminating forwardly in a mount adjacent the top of the stanchion assembly and rearwardly in forked legs adapted to carry said guard whereby it will overlie the buttocks of a cow when positioned in the stanchion assembly, mounting means on the stanchion assembly swingably retaining the mount and securing the body against rotation about its axis, and a tail-encompassing member carried by said legs and adapted to normally lie in outwardly spaced relation with respect to the cow's tail but to limit the switching movement thereof.

2. In a stanchion assembly having a cow tail guard the improvement comprising an elongated body terminating forwardly in a mount adjacent the top of the stanchion assembly and rearwardly in forked legs adapted to carry said guard whereby it will overlie the buttocks of a cow when positioned in the stanchion assembly, mounting means on the stanchion assembly swingably retaining the mount and securing the body against rotation about its axis, and a tail-encompassing member pivotally mounted at spaced and axially aligned points on said forked legs and adapted to normally lie in outwardly spaced relation with respect to the cow's tail but to limit the switching movement thereof.

3. A cow tail guard comprising an elongated carrying frame adapted to be positioned above and longitudinally of a cow, said frame having a pair of horizontally spaced legs at the rear thereof, means rockably and shiftably mounting the forward end of said frame while maintaining said legs in horizontally spaced relation, and a tail-restraining looped member having a pair of arms respectively secured to the spaced legs.

4. A cow tail guard comprising an elongated carrying frame adapted to be positioned above and longitudinally of a cow, said frame having a pair of horizontally spaced legs at the rear thereof, means rockably and shiftably mounting the forward end of said frame while maintaining said legs in horizontally spaced relation, and a tail-restraining looped member pivotally mounted on a horizontal axis traversing said spaced legs, said looped member terminating downwardly in free ends adapted to rest lightly against the hind legs of a cow.

5. A cow tail guard comprising an elongated carrying frame adapted to be positioned above and longitudinally of a cow, said frame having a pair of horizontally spaced legs at the rear thereof, means rockably and shiftably mounting the forward end of said frame while maintaining said legs in horizontally spaced relation, a tail-restraining looped member having a pair of arms respectively secured to the spaced legs, and resilient means to urge the frame and looped member lightly against a cow when in lowered position.

References Cited in the file of this patent
UNITED STATES PATENTS

| | | |
|---|---|---|
| 317,045 | Thompson | May 5, 1885 |
| 1,009,714 | Batchelder | Nov. 28, 1911 |
| 2,645,203 | Jaksekowich | July 14, 1953 |